(12) United States Patent
Fowler et al.

(10) Patent No.: US 6,677,517 B2
(45) Date of Patent: Jan. 13, 2004

(54) LIGHTNING SUPPRESSION SYSTEM FOR POWER LINES

(76) Inventors: William J. Fowler, 2162 Gulf Terminal Dr., Houston, TX (US) 77023; Benjamin P. Fowler, 2162 Gulf Terminal Dr., Houston, TX (US) 77023

( * ) Notice: Subject to any disclaimer, the term of this patent is extended or adjusted under 35 U.S.C. 154(b) by 0 days.

(21) Appl. No.: 09/882,710

(22) Filed: Jun. 18, 2001

(65) Prior Publication Data

US 2002/0170725 A1 Nov. 21, 2002

Related U.S. Application Data

(63) Continuation-in-part of application No. 09/855,355, filed on May 15, 2001.

(51) Int. Cl.[7] ............................................. H02G 13/00
(52) U.S. Cl. ........................ 174/3; 174/55 G; 174/68.1
(58) Field of Search ........................... 174/2, 3, 55 G, 174/6, 68.1, 70 R; 361/117, 39, 40

(56) References Cited

U.S. PATENT DOCUMENTS

| | | | | |
|---|---|---|---|---|
| 3,938,384 A | * | 2/1976 | Blair | 73/204.22 |
| 4,604,673 A | * | 8/1986 | Schoendube | 361/38 |
| 4,689,713 A | * | 8/1987 | Hourtane et al. | 361/111 |
| 4,802,055 A | * | 1/1989 | Beckerman | 361/111 |
| 5,021,315 A | * | 6/1991 | Goldman | 430/106.2 |
| 5,167,537 A | | 12/1992 | Johnescu et al. | |
| 5,218,507 A | * | 6/1993 | Ashley | 174/36 |
| 5,694,286 A | * | 12/1997 | Fowler et al. | 174/7 |
| 5,749,178 A | * | 5/1998 | Garmong | 174/35 MS |
| 5,844,766 A | | 12/1998 | Miglioli | |
| 5,969,932 A | * | 10/1999 | Ryan et al. | 361/117 |
| 5,987,335 A | * | 11/1999 | Knoedl et al. | 455/117 |
| 6,011,682 A | * | 1/2000 | Storey | 361/117 |
| 6,141,919 A | * | 11/2000 | Robinson | 248/562 |
| 6,177,630 B1 | * | 1/2001 | Stensgaard | 174/2 |

* cited by examiner

Primary Examiner—Dean A. Reichard
Assistant Examiner—Jinhee J Lee
(74) Attorney, Agent, or Firm—Harrison & Egbert

(57) ABSTRACT

A lightning suppression system for a power supply line including an enclosure with an interior volume, a first coil positioned within the interior volume of the enclosure, a second coil positioned within the interior volume of the enclosure, and a third coil positioned within the interior volume of the enclosure. The power supply line is connected to the leads of the first, second and third coils. A conductive grit fills a portion of the interior volume of the enclosure. A grounding rod is connected by a conductive line to the enclosure.

2 Claims, 5 Drawing Sheets

LIGHTNING SUPPRESSION SYSTEM FOR POWER LINES

CROSS REFERENCE TO RELATED APPLICATIONS

The present application is a continuation-in-part of U.S. patent application Ser. No. 09/855,355, filed on May 15, 2001, and entitled "LIGHTNING SUPPRESSION ATTENUATOR AND SYSTEM EMPLOYING SAME", presently pending.

BACKGROUND OF THE INVENTION

1. Field of the Invention

The present invention relates to lightning suppression attenuator. More particularly, the present invention relates to devices for reducing the magnitude of current of a lightning current wavefront as it moves along a power line from a power strike. More particularly, the present invention relates to devices for protecting electrical systems and critical load systems of facilities that are connected to a power line subject to lightning strikes.

2. Description of Related Art

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased, rather than diminished, the damaged caused by lightning. This is because relatively low voltage and current levels can damage integrated circuits and other modern electronic components, with the result that many electronic devices are more susceptible to lightning damage today than ever before. Many devices to which microprocessors technology has been added are more susceptible to lightning damage as a result of such improvements. Additionally, lightning is capable of inducing substantial currents not only in electrical circuits directly struck by it but also in circuits located within the magnetic field induced by a nearby lightning strikes, giving each strike enormous destructive potential.

One of the most common areas of lightning strikes are large telecommunications and camera towers that extend upwardly from the earth. Typically, such towers include an electronic device at the top which serves to transmit or receive information. Since lightning will follow a path of least resistance on its way to the earth, the towers are very attractive to lightning. It is well known that lightning is particularly attracted to areas of positive ions and is repelled by areas of negative ions. Since the electronic devices at the top of towers often operate on AC power, an attractive source of positive ions is generated at the top of the tower.

A major problem associated with lightning strikes is the propagation of the lightning current wavefront along power lines. Quite commonly, power lines exist on elevated towers that are especially subject to lightning strikes. In other circumstances, the power lines can be positioned so that they are subject to ground transference of the wavefront of current from a lightning strike to the earth or an adjacent building. The lightning wavefront through the power line can travel to various instruments, devices and appliances that are connected to the power supply. If the lightning wavefront is of sufficient magnitude, then any lightning suppression devices connected to the power supply will be insufficient in preventing damage to the equipment connected to the power supply. This can result in damage that is expensive and requires time-consuming repair.

In the past, various U.S. patents have issued relating to lightning suppression attenuators. For example, U.S. Pat. No. 5,844,766, issued on Dec. 1, 1998 to L. Miglioli, describes a lightning suppression system for tower mounted antenna systems. This lightning strikes includes a directional coupler, a quarter-wavelength stub, a first cylindrical capacitor, a second cylindrical capacitor and a lightning suppression circuit. The lightning suppression circuit suppresses high voltage direct current and low frequency signals such as those produced by near lightning strikes. The lightning suppression circuit includes a gas discharge tube, an inductor element, a varistor, a resistor element and a zener diode. The gas discharge tube and the inductor element are connected to a second cylindrical capacitor. The varistor and the resistor element are connected to an inductor element. The zener diode and the amplifier are connected to the resistor element.

U.S. Pat. No. 5,167,537, issued on Dec. 1, 1992 to Johnescu et al., describes a high density MLV contact assembly capable of low working voltages and high energy handling capacity, including lightning suppression. This assembly employs a multi-layered varistor as the transient suppression device.

It is an object of the present invention to provide a lightning suppression attenuator that effectively prevents lightning strikes from affecting equipment connected to a power supply.

It is another object of the present invention to provide a lightning suppression attenuator that effectively minimizes the magnitude of a lightning current as it moves along a power line.

It is a further object of the present invention to provide a lightning suppression attenuator which minimizes the damaging effects of lightning.

It is a further object of the present invention to provide a lightning suppression attenuator which is easy to install, relatively inexpensive and easy to manufacture.

These and other objects and advantages of the present invention will become apparent from a reading of the attached specification and appended claims.

BRIEF SUMMARY OF THE INVENTION

The present invention is a lightning suppression system comprising an enclosure having an interior volume, a first coil positioned within the interior volume of the enclosure, a second coil positioned within the interior volume of the enclosure, and a power supply connected to the leads of the first and second coils. A third coil can be also positioned within the interior volume of the enclosure. The power supply is also connected to the leads of the third coil.

Where two coils are used in the enclosure, the power supply is a single phase power supply. Where three coils are positioned on the interior of the enclosure, the power supply is a three phrase power supply.

A grounding rod is connected by a conductive line to the enclosure. The grounding rod includes a central shaft, and a plurality of vanes extending radially outwardly from the central shaft. The central shaft and the plurality of vanes are formed of a conductive material. A conductive band extends around the interior volume of the enclosure. The conductive line is connected to this conductive band. A conductive grit fills a portion of the enclosure. In the preferred embodiment of the present invention, the conductive grit is steel shot. A rigid foam material can be affixed within the enclosure around the conductive grit and over the coils.

Each of the first and second coils has a central void with turns of wire extending around the central void. In the preferred embodiment of the present invention, the wire is 600 volt black superflex copper wire. The coil has greater than 30 turns of wire around the central void. Each of the coils has leads which extend outwardly of the enclosure for connection to the power supply.

DETAILED DESCRIPTION OF THE INVENTION

Figure 1:
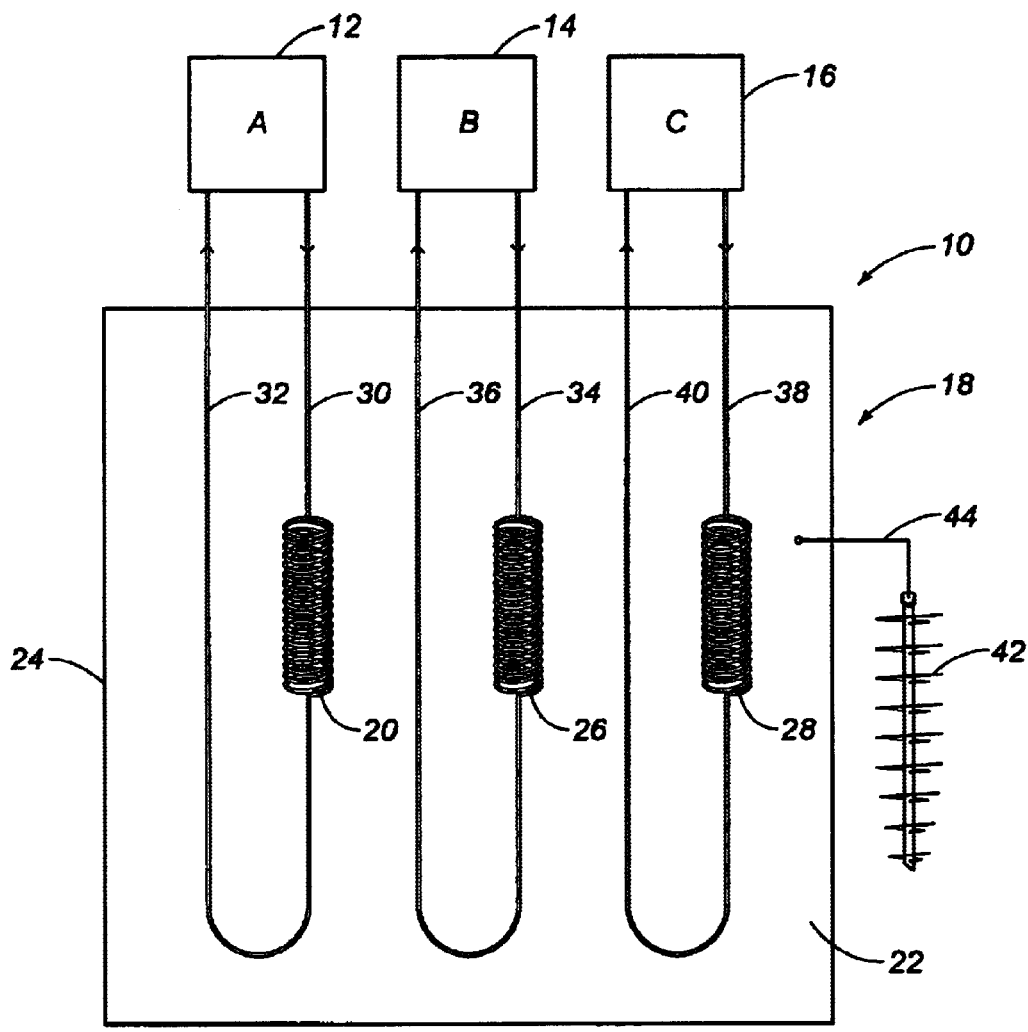
FIG. 1 is a diagrammatic illustration of the lightning suppression system of the present invention.

Referring to FIG. 1, there is shown at 10 the lightning suppression system in accordance with the preferred embodiment of the present invention. The lightning suppression system 10 is particularly adapted for connection to a three phase power supply. As such, the lightning suppression system 10 includes phases 12, 14 and 16 that are connected to the lightning suppression attenuator 18.

The lightning suppression attenuator of the present invention includes a first coil 20 positioned within the interior volume 22 of the enclosure 24 of the lightning suppression attenuator 18. A second coil 26 is also positioned within the interior volume 22 of the enclosure 24. A third coil 28 is also positioned within the interior volume 22 of the enclosure 24.

The first coil 20 has a first lead 30 and a second lead 32 which extend outwardly of the enclosure 24. Leads 30 and 32 are connected to phase A of the power supply. The second coil 26 has a first lead 34 and a second lead 36 that extend outwardly of the enclosure 24. Leads 34 and 36 are connected to phase B. Third coil 28 has a first lead 38 and a second lead 40 that extend outwardly of the enclosure 24 and are connected to the phase C.

Figure 5:
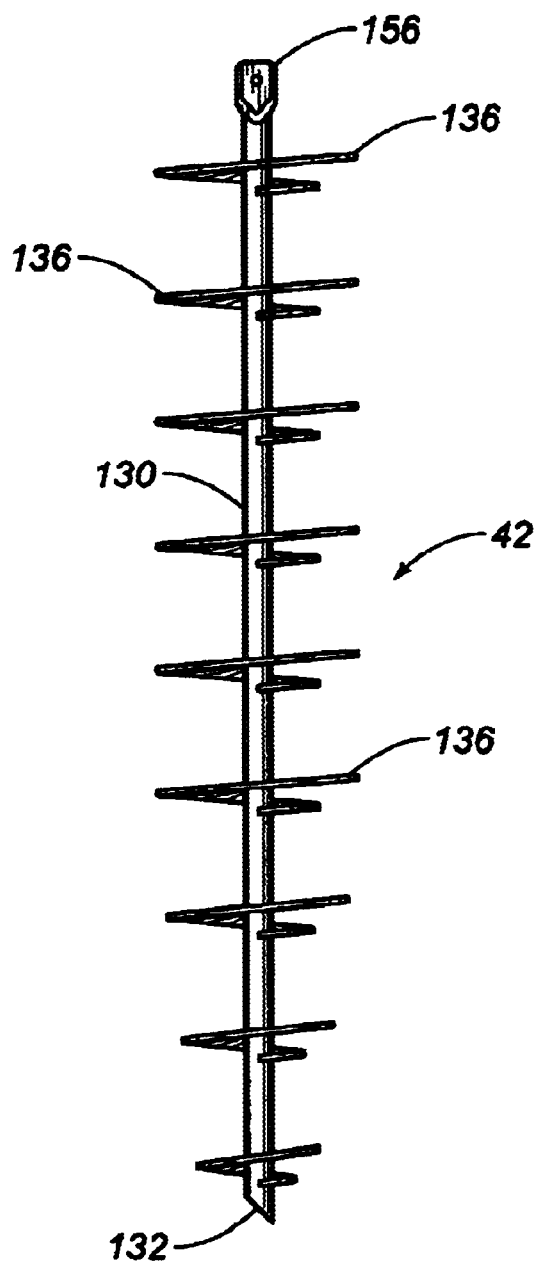
FIG. 5 is a side elevational view showing the grounding rod as used in the present invention.

A grounding rod 42 is connected by a conductive line 44 to the interior 22 of enclosure 24. The grounding rod 42 will have a configuration similar to that shown in FIG. 5 attached hereto. The conductive line 44 is #6 copper wire. As will be described hereinafter, the conductive line 44 will be connected to a conductive band extending through the steel shot within the interior volume 22 of enclosure 24. Also, as will be described hereinafter, a conductive grit, such as steel shot, will fill at least a portion of the interior volume 22 of enclosure 24 and generally surround the coils 20, 26 and 28. When the lightning strike hits the power line, represented by the phases 12, 14 and 16, it will travel along the power line and through the coils 20, 26 and 28. As the lightning current wavefront goes through the respective coils 20, 26 and 28, it will generate counter EMF forces within the respective coils. These counter EMF forces will dissipate the lightning in the form of heat into the conductive grit within the interior 22 of the enclosure 24. The conductive line 44 associated with grounding rod 42 will further dump the lightning to ground before the lightning wavefront will travel along the power line to affect equipment connected to the power supply. The lightning suppression system 10, along with the lightning suppression attenuator 18, is intended to be connected, in line, along a power supply line. The three-phase system 10, as shown in FIG. 1, is particularly useful for 120/240 volt three-phase power, 120/208 volt three-phase power, 277/480 volt three-phase power and 220/380 volt three-phase power. The wire associated with the respective leads for the various coils and for the coils themselves is black superflex 600 volt copper wire.

Figure 2:
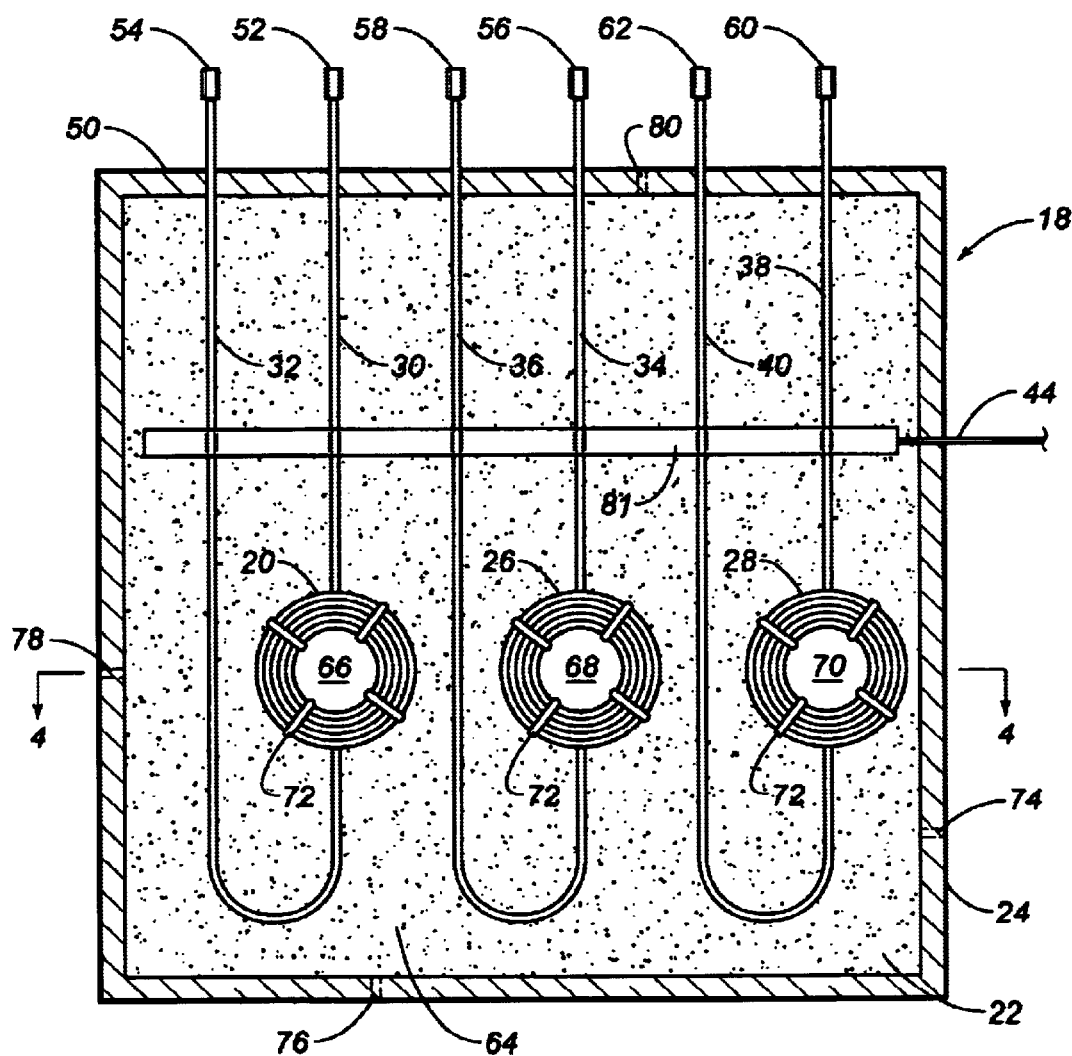
FIG. 2 is a interior view of the lightning suppression attenuator in accordance with the preferred embodiment of the present invention.

FIG. 2 shows the lightning suppression attenuator 18 in accordance with the teachings of the present invention. The lightning suppression attenuator 18 includes the enclosure 24 having interior volume 22. Coils 20, 26 and 28 are received within the interior volume 22 of the enclosure 24. Coil 20 has first lead 30 and a second lead 32 extending outwardly through the wall 50 of the enclosure 24. First lead 30 has a connector 52 at an end thereof. The second lead 32 has a connector 54 at an end thereof. Connectors 52 and 54 are suitable for connecting to a power supply.

The coil 26 has first lead 34 and second lead 36 extending outwardly of the wall 50 of the enclosure 24. First lead 34 has a connector 56 at an end thereof. Lead 36 has a connector 58 at an end thereof. Connectors 56 and 58 are suitable for connection, in a conventional manner, to a power supply line.

The third coil 28 has first lead 38 and second lead 40 extending outwardly of the wall 50 of the enclosure 24. The first lead 38 has a connector 60 at an end thereof. The second lead 40 has a connector 62 at an end thereof. Connectors 60 and 62 are suitable for connection, in a conventional manner, to a power supply line.

As can be seen in FIG. 2, the enclosure 24 is a box formed of a polyvinyl chloride (PVC) material. In the preferred embodiment of the present invention, the enclosure 24 is eight inches wide by eight inches long and by four inches deep. As will be described hereinafter, a cover is positioned over the top surface of the enclosure 24. A conductive grit material 64 (shown in greater detail in FIG. 4) resides on the bottom of the enclosure 24 within the interior volume 22. The coils 20, 26 and 28 are located within the enclosure 24 upon the grit 64.

Each of the coils 20, 26 and 28 are in the preferred embodiment of the present invention, coils of black 600 volt superflex insulated copper wire. Each of the coils 20, 26 and 28 are formed of at least 30 turns of wire around respective voids 66, 68 and 70 formed in the center of the respective coils. Cinch straps 72 serve to secure the coils 20, 26 and 28 together around the respective central voids 66, 68 and 70. The cinch straps 72 are positioned at even intervals around the circumference of the respective coils. The coils 20, 26 and 28 are dipped in glyptal and dried for 24 hours.

After the coils 20, 26 and 28 are installed upon the layer 64 of conductive grit, the remainder of the enclosure 24 is filled with another coarse steel grit to within one-half inch from the top of the enclosure 24. As can be seen in FIG. 1, holes 74, 76, 78 and 80 are formed in each of the walls of the enclosure 24. The holes 74, 76, 78 and 80 allow an expandable foam, such as polyurethane, to be injected into the interior volume 22 so as to extend around the conductive grit 64 within the enclosure 24 and over and around the coils 20, 26 and 28. As such, the interior volume 22 will be completely sealed.

In FIG. 2, it can be seen that a conductive band 81 extends around the interior volume 22 within the enclosure 24. The conductive band 81 is connected to the conductive line 44 associated with the grounding rod 42. The conductive band 81 will extend over and through the conductive grit 64 so as to facilitate the dumping of the lightning current to the ground. The conductive band 81 will be a copper band.

Figure 3:
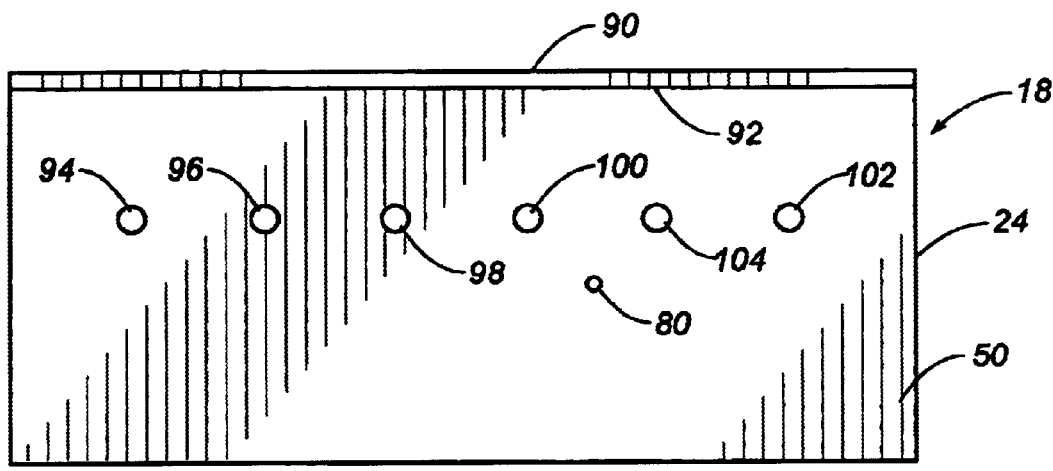
FIG. 3 is a side elevational view of the lightning suppression attenuator of the present invention.

FIG. 3 shows the exterior view of the enclosure 24 at wall 50. As can be seen, a lid 90 is affixed onto the top opening 92 of the enclosure 24. In particular, the lid 90 can be screwed onto the top 92 of the enclosure 24 so as to securely seal the interior volume 22. The hole 80 allows expandable foam to be injected into the interior volume 22. Suitable holes 94 and 96 are formed in the wall 50 so as to allow the leads 30 and 32 of the first coil 20 to extend outwardly therefrom. Holes 98 and 100 are formed on wall 50 so as to allow leads 34 and 36 of the second coil 26 to extend outwardly therefrom. Holes 102 and 104 are formed on wall 50 so as to allow leads 38 and 40 of the third coil 28 to extend outwardly therefrom. Suitable watertight connections can be positioned around the holes 94, 96, 98, 100, 102 and 104 so as to prevent liquid intrusion into the interior volume 22.

Figure 4:
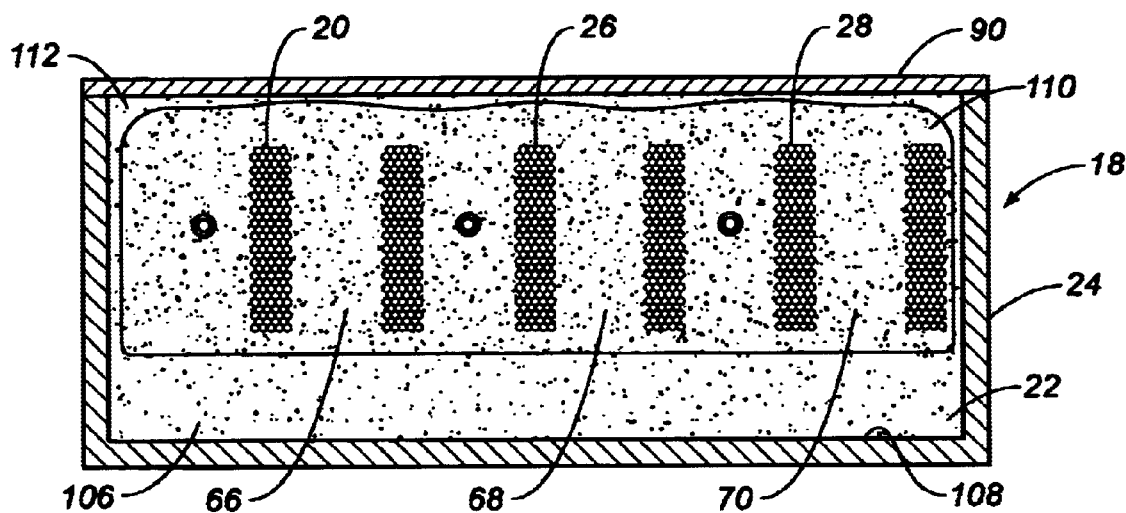
FIG. 4 is a cross-sectional view as taken across lines 4—4 of FIG. 2 showing the interior of the lightning suppression attenuator of the present invention.
Figure 6:
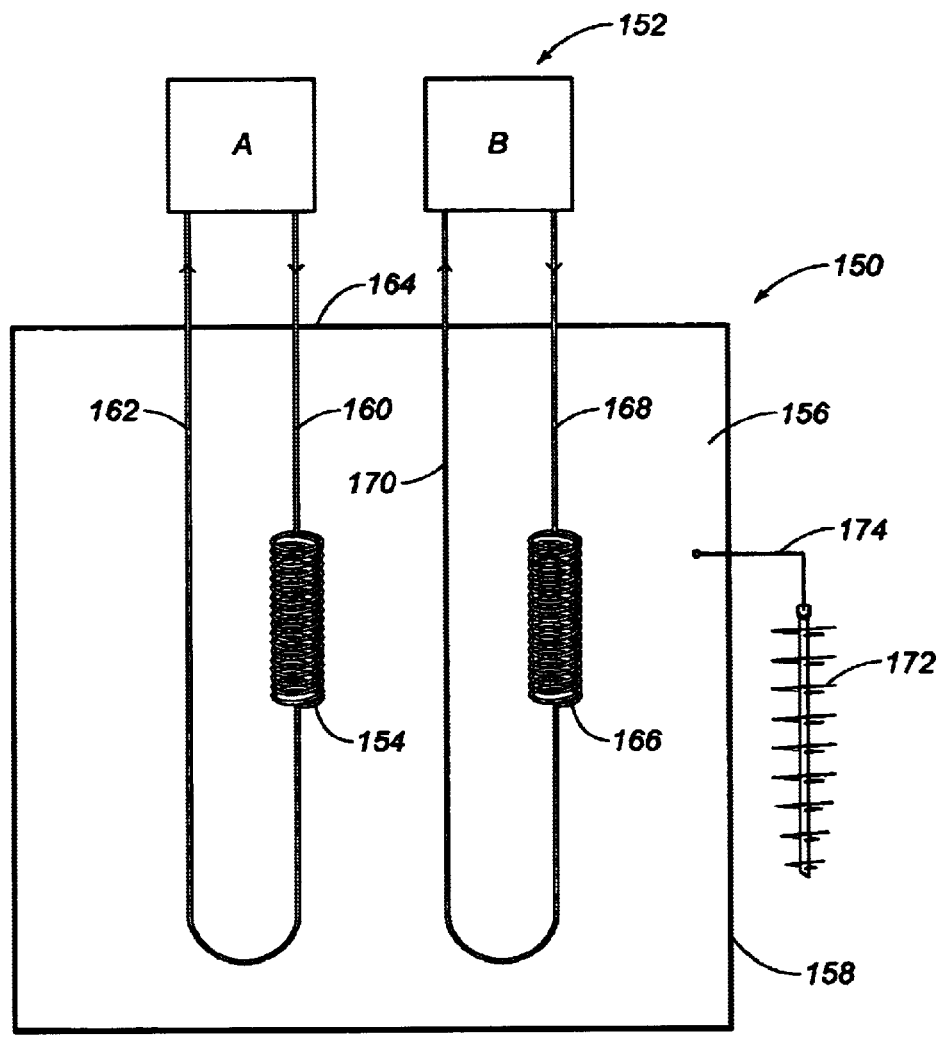
FIG. 6 is a diagrammatic illustration of an alternative embodiment of the lightning suppression attenuator of the present invention as used with single phase power supplies.

Referring to FIG. 4, the interior configuration of the lightning suppression attenuator 18 is particularly shown. The enclosure 24 has lid 90 affixed thereover. The interior volume 22 includes a first layer 106 of coarse steel grit residing on the bottom 108 of the enclosure 24. The coarse steel grit, in the preferred embodiment of the present invention, is steel shot. The coils 20, 26 and 28 are placed upon the top of the layer 106. Another layer 110 of coarse steel grit is then placed upon the first layer 106 and over and around the coils 20, 26 and 28. The expandable foam material 112 will extend around the grit 110 and around the coils 20, 26 and 28 so as to fully seal the coils 20, 26 and 28 within the interior volume 22 of the enclosure 24. As can be seen in FIG. 6, the first coil 20 has void 66 formed therein. The second coil 26 has void formed therein. A third coil 28 has void 70 formed therein. The steel shot 110 is introduced so as to extend through the void 66, 68 and 70.

FIG. 6 illustrates, in detail, the particular configuration of grounding rod 42 as used in the present invention. It can be seen that the grounding rod 42 has a central shaft 130 that extends from the pointed base 132 to the connection point 134. A plurality of spiral-shaped vanes 136 are positioned in spaced relationship longitudinally along the length of the shaft 130. Each of the spiral-shaped vanes 136 creates the "digging" action of the grounding rod 42. By rotating the grounding rod 42, the vanes 136 will engage the earth so as to draw the grounding rod 72 into the earth. The connection point 134 can be connected to a suitable rotational mechanism. After removal from the rotational mechanism, the connection point 134 can be used as the contact point for the electrical line 44. As can be seen, the great surface area along each of the vanes 136 and along the shaft 130 establishes strong electrical connections between the grounding rod 42 and the earth. A carbon electrolyte can be placed over the surfaces of the grounding rod 42 so as to further establish a strong electrical connection.

FIG. 6 shows a configuration of an alternative embodiment 150 of the present invention. The alternative embodiment 150 is for use with single phase power supplies. The single phase power supply 152 includes phases A and B. Phase A is connected to a first coil 154 positioned within the interior volume 156 of enclosure 158. The first coil 154 has a first lead 160 and a second lead 162 extending outwardly of the wall 164 of enclosure 158. The leads 160 and 162 are connected to phase A of power supply 152.

The second coil 166 has a first lead 168 and a second lead 170. Leads 168 and 170 extend outwardly of the wall 164 of enclosure 158. Leads 168 and 170 are connected to phase B of power supply 152. The interior volume 156 of enclosure 158 will be filled with a conductive grit, such as steel shot, in the matter described in the previous embodiment of the present invention. A grounding rod 172 is connected by a conductive line 174 to the interior volume 156 of enclosure 158. Grounding rod 172 will have a configuration similar to that shown in FIG. 5. The conductive line 174 can be connected to a point within the interior volume 156 or connected to the copper band illustrated, with particularity, in FIG. 2.

The embodiment 150, as shown in FIG. 6, is particularly adapted to 120/240 volt one-phase power supplies. Each of the coils 154 and 166 will have a configuration similar to that of the previous embodiment of the present invention. The most important difference between the embodiment 150, as shown in FIG. 6, and the previous embodiment of the present invention is the inclusion of only two coils 154 and 166 instead of the three coils of the previous embodiment.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

We claim:

1. A lightning suppression attenuator for a power supply line comprising:

an enclosure having an interior volume;

a first coil positioned within said interior volume of said enclosure, said first coil having a first lead and a second lead extending outwardly of said enclosure, said first coil having a first connector at an end of said first lead, said first coil having a second connector at an end of said second lead;

a second coil positioned within said interior volume of said enclosure, said second coil having a first lead and a second lead extending outwardly of said enclosure, said second coil having a first connector at an end of said first lead, said second coil having a second connector at an end of said second lead;

a third coil positioned within said interior volume of said enclosure, said third coil having a first lead and a second lead extending outwardly of said enclosure, said third coil having a first connector at an end of said first lead, said third coil having a second connector at an end of said second lead;

a grounding rod connected by a conductive line to said interior volume of said enclosure;

a conductive band extending around said interior volume of said enclosure, said conductive line connected to said conductive band; and a non-gaseous conductive grit filling a portion of said enclosure.

2. The attenuator of claim 1, said conductive grit being steel shot.

* * * * *